(12) United States Patent
Leonard

(10) Patent No.: US 10,014,928 B2
(45) Date of Patent: Jul. 3, 2018

(54) INTEGRATED ARCHITECTURE FOR NEAR-REAL-TIME SATELLITE IMAGING APPLICATIONS

(71) Applicant: DigitalGlobe, Inc., Longmont, CO (US)

(72) Inventor: Victor H Leonard, Brighton, CO (US)

(73) Assignee: DIGITALGLOBE, INC., Longmont, CO (US)

( * ) Notice: Subject to any disclaimer, the term of this patent is extended or adjusted under 35 U.S.C. 154(b) by 358 days.

(21) Appl. No.: 14/800,644

(22) Filed: Jul. 15, 2015

(65) Prior Publication Data

US 2016/0020848 A1  Jan. 21, 2016

Related U.S. Application Data

(60) Provisional application No. 62/025,003, filed on Jul. 15, 2014.

(51) Int. Cl.
*H04B 7/185* (2006.01)
*H04B 10/118* (2013.01)

(52) U.S. Cl.
CPC ..... *H04B 7/18528* (2013.01); *H04B 7/18523* (2013.01); *H04B 10/118* (2013.01); *H04B 7/18513* (2013.01)

(58) Field of Classification Search
CPC .............. H04B 10/118; H04B 7/18513; H04B 7/18528; H04B 7/185; H04B 7/18502; H04B 7/15; H04B 7/1851; H04B 7/18521; H04B 7/18523; H04B 7/1853; H04B 7/18576; H04B 7/18578; H04B 7/19; H04B 7/195
See application file for complete search history.

(56) References Cited

U.S. PATENT DOCUMENTS 5,999,127 A * 12/1999 Dezelan ................... H01Q 3/02
                                                              342/352
6,208,625 B1 * 3/2001 Zancho .............. H04B 7/18589
                                                              370/316

\* cited by examiner

*Primary Examiner* — Oussama Roudani
(74) *Attorney, Agent, or Firm* — Galvin Patent Law LLC; Brian R. Galvin

(57) ABSTRACT

A system for operating an integrated architecture for near real-time satellite communications, comprising a plurality of collector satellites augment by aerial and terrestrial sensing systems that capture a plurality of EO, SAR and/or Signals sensor data of a portion of a region of the surface of the Earth, and a plurality of connector satellites that communicate with at least a collector satellite using a communication interface, and a method for using advanced environmental monitoring to adaptively task a collector satellite.

4 Claims, 10 Drawing Sheets

INTEGRATED ARCHITECTURE FOR NEAR-REAL-TIME SATELLITE IMAGING APPLICATIONS

CROSS-REFERENCE TO RELATED APPLICATIONS

The present application claims the benefit of, and priority to, U.S. provisional patent application Ser. No. 62/025,003, titled "INTEGRATED ARCHITECTURE FOR NEAR-REAL-TIME SATELLITE IMAGING APPLICATIONS" and filed on Jul. 15, 2014, the entire specification of which is incorporated herein by reference in its entirety.

BACKGROUND OF THE INVENTION

Field of the Invention

The present invention is in the field of remote sensing systems and technology, and more particularly it pertains to an integrated architecture for operating a constellation of sensing satellites augmented by aerial and terrestrial sensing systems adapted to provide near-real-time, very high performance electro-optic (EO), synthetic aperture radar (SAR) and/or signals sensor data of the earth. The present invention is a method for creating virtual information persistence (VIP) that partially addresses the long-standing need for effectively persistent monitoring and not just occasional revisiting of important areas of interest and the objects arriving, acting and/or departing therein, with near-real-time bidirectional communications.

Discussion of the State of the Art

Satellite imaging and signals sensing has been developing rapidly over the past thirty years. Starting with low-resolution earth observation satellites that enabled basic environmental monitoring to be undertaken, a steady stream of improvements has led to the current state, in which a large number of high and very high resolution satellites observe the earth, in a wide range of spectral bands, every day. These satellites allow analysts—and automated systems—to extract meaningful information about environmental conditions and changes in them, about human activities such as wars, and about natural disasters such as floods, earthquakes, tsunamis, and the like. Indeed, even ordinary consumers use products derived directly from imaging satellites daily, including for example GOOGLE EARTH™.

Despite the rapid progress, there are still several challenges involved in satellite imaging and signals sensing. Large, complex electro-optic satellites, for example, can observe the earth at very high resolution across many spectral bands, which allows both fine details to be observed and comparisons to be made between different spectral bands (which is often useful for example to assess the state of vegetation). But they are extremely expensive to design, build, and operate, and hence tend to be few in number. Smaller satellites and even microsatellites are beginning to proliferate, but they tend to be lower resolution, and they usually operate at lower orbits which means they have smaller footprints on the earth and fewer opportunities to interact with remote ground terminals (RGTs). In both cases, two prominent challenges emerge: it is difficult to get nearly continuous observational coverage of the earth (except through use of geostationary satellites, which are generally only suited for very coarse (e.g., greater than 100 meter ground sampling distance pixel) resolution), and it is difficult to get access to the data that has been collected in near real time. The first problem emerges because either there are few high-end satellites and thus only intermittent coverage of each location, or many low-end satellites and more frequent coverage but in lower resolution and across a smaller number of frequency bands. The second problem occurs because remote ground terminals are typically only located on land (which is limited to 30% of the earth's surface) in friendly locations (again limiting the number of locations significantly).

What is needed in the art is an integrated architecture—meaning a constellation of satellites and supporting systems—that is capable of collecting nearly continuous imagery coverage of multiple, geographically-separated areas of interest per day over the whole earth, from at least one member of the constellation at any given time of day with a sensing modality that is or can be correlated with an adjacently preceding and an adjacently succeeding constellation member.

SUMMARY OF THE INVENTION

The inventor has accordingly conceived and reduced to practice an integrated architecture designed to address the needs described above. In the proposed invention, we expand the composition of satellites from predominantly mid-morning or mid-afternoon polar, sun-synchronous orbits to polar and mildly inclined orbits with a complete range of earlier or later times of descending nodes and orbital inclinations at the equator. We further include electro-optic (EO) satellites, synthetic aperture radar (SAR) satellite and signals (including, but not limited to Automated Identification System (AIS)) satellites. The range of EO satellites to be considered include configurations of imaging bands with spatial resolution, spectral resolution and spectral range (spectrum) that are approved or could be approved by the National Oceanic and Atmospheric Administration (NOAA). Spectral ranges could include ultraviolet (UV), visible (VIS), near-infrared (NIR), short-wave-infrared (SWIR), mid-wave infrared (MWIR) and thermal-infrared (TIR). The range of SAR sensors to be considered include configurations using radio-frequency (RF) bands and modalities that are approved or could be approved by the NOAA.

According to a preferred embodiment of the invention, a system for operating an integrated architecture for near real-time satellite communications, comprising a plurality of collector satellites, each comprising at least a plurality of EO, SAR and/or Signals sensor hardware and a plurality of software instructions stored in a memory and operating on a processor of the satellite, wherein the software instructions are configured to capture a plurality of EO, SAR and/or Signals sensor data of at least a portion of a region of the surface of the Earth, the image data being based at least in part on sensor data received from at least a portion of the plurality of EO, SAR and/or Signals sensor hardware, and the region of the surface of the Earth being based at least in part on the satellite's position above the surface of the Earth; and a plurality of connector satellites, each comprising at least a plurality of communication interfaces configured to provide two-way communication with at least a collector satellite, and a plurality of software instructions stored in a memory and operating on a processor of the satellite, wherein the software instructions are configured to communicate with at least a collector satellite using a communication interface; wherein at least a portion of the collector satellites and at least a portion of the connector satellites are arranged in a plurality of offset orbits about the Earth, is disclosed.

According to another preferred embodiment of the invention, a method for using advanced environmental monitoring to adaptively task a collector satellite, comprising the steps of receiving, at a connector satellite comprising at least a plurality of communication interfaces configured to provide two-way communication with at least a collector satellite, and a plurality of software instructions stored in a memory and operating on a processor of the satellite, wherein the software instructions are configured to communicate with at least a collector satellite using a communication interface, a plurality of operating instructions comprising software instructions stored in a memory and operating on a processor of the satellite; observing a plurality of environmental conditions in a region of the surface of the Earth, the region being based at least in part on the connector satellite's position over the surface of the Earth; communicating at least a portion of the environmental data to a collector satellite comprising at least a plurality of EO, SAR and/or Signals sensor hardware and a plurality of software instructions stored in a memory and operating on a processor of the satellite, wherein the software instructions are configured to capture a plurality of EO, SAR and/or Signals sensor data of at least a portion of a region of the surface of the Earth, the sensor data being based at least in part on sensor data received from at least a portion of the plurality of EO, SAR and/or Signals sensor hardware, and the region of the surface of the Earth being based at least in part on the satellite's position above the surface of the Earth; updating, at the collector satellite, a plurality of programming instructions stored in a memory and operating on a processor of the satellite, the update being based at least in part on at least a portion of the plurality of environmental data; and collecting, at the collector satellite, a plurality of image data pertaining to a region of the surface of the Earth, the region being based at least in part on the satellite's position over the surface of the Earth, and the image data being based at least in part on at least a portion of the updated programming instructions, is disclosed.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
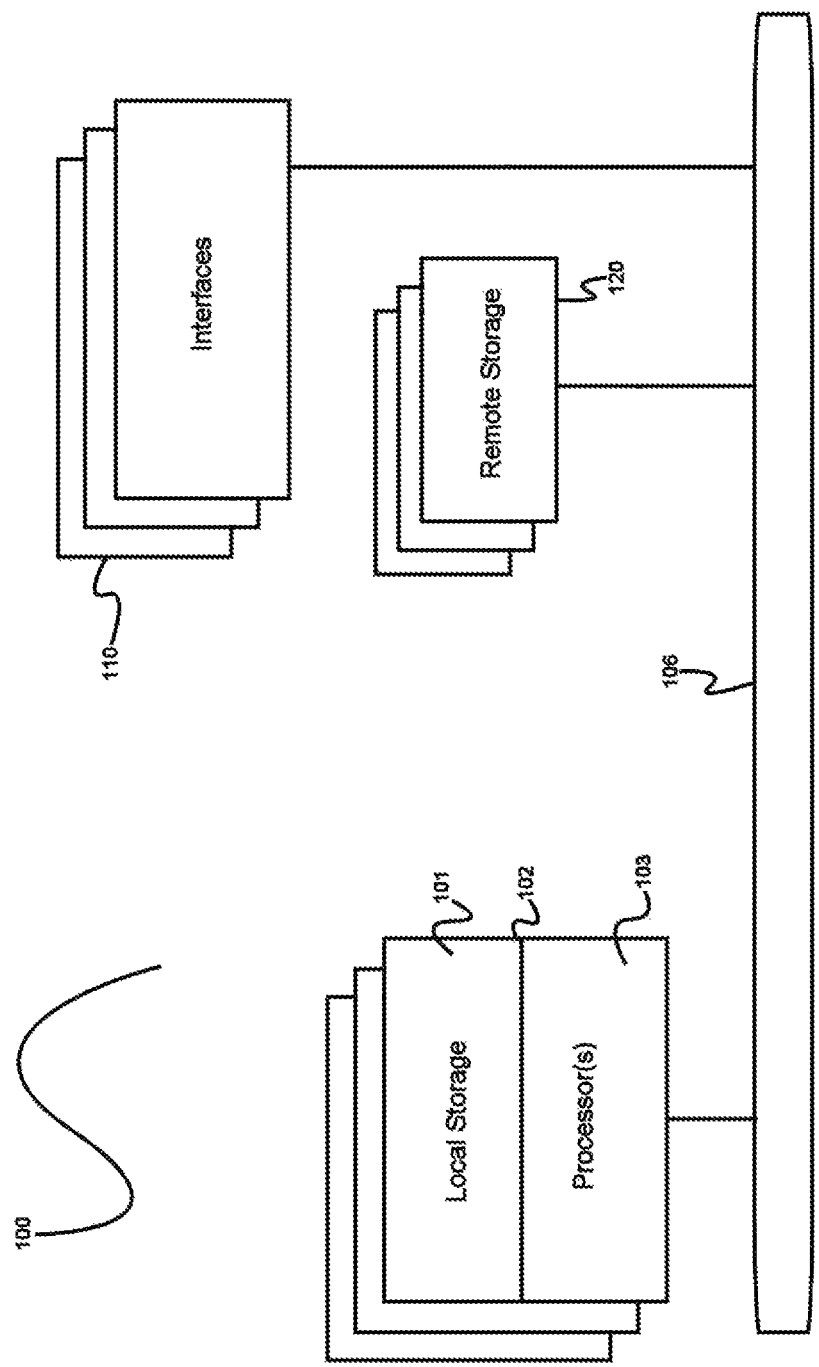
FIG. 1 is a block diagram illustrating an exemplary computer hardware architecture of a computing device used in an embodiment of the invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, many of the techniques disclosed herein may be implemented on hardware or a combination of software and hardware, whether resident in a satellite, in a remote ground terminal, or in one or more data centers connected via a network to satellites and/or remote ground terminal. For example, they may be implemented in an operating system kernel, in a separate user process, in a library package bound into network applications, on a specially constructed machine such as a satellite with embedded software, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, ground control interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
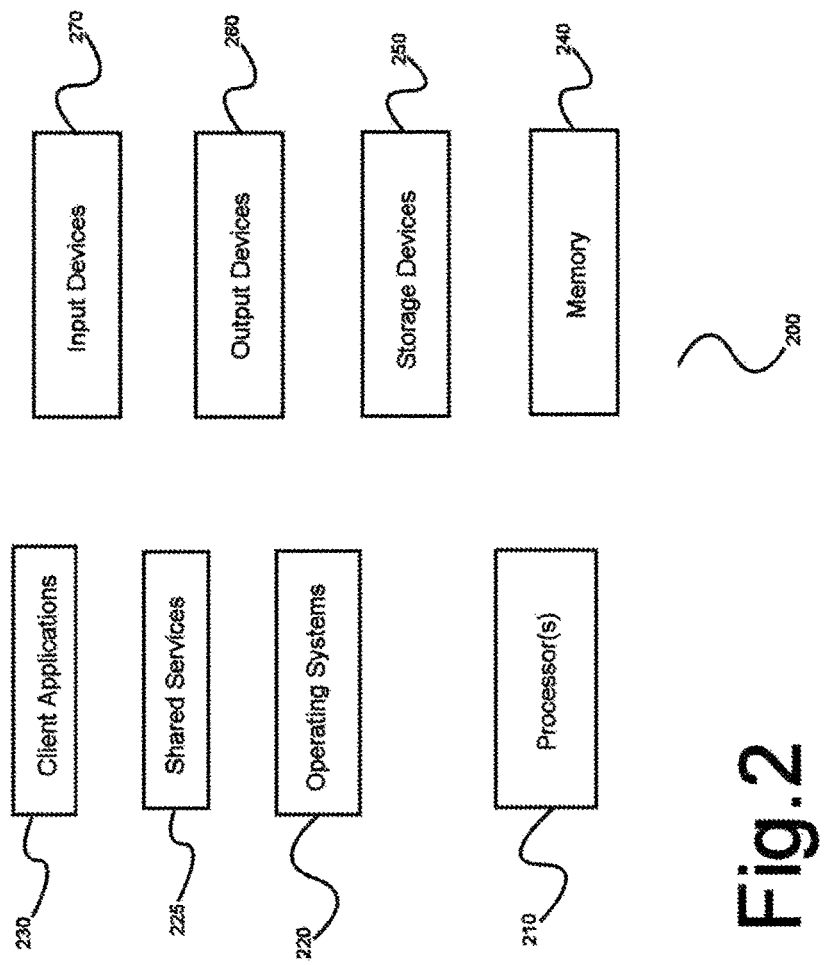
FIG. 2 is a block diagram illustrating an exemplary logical architecture for a client device, according to an embodiment of the invention.

In some embodiments, systems according to the present invention may be implemented on one or more a standalone computing systems. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
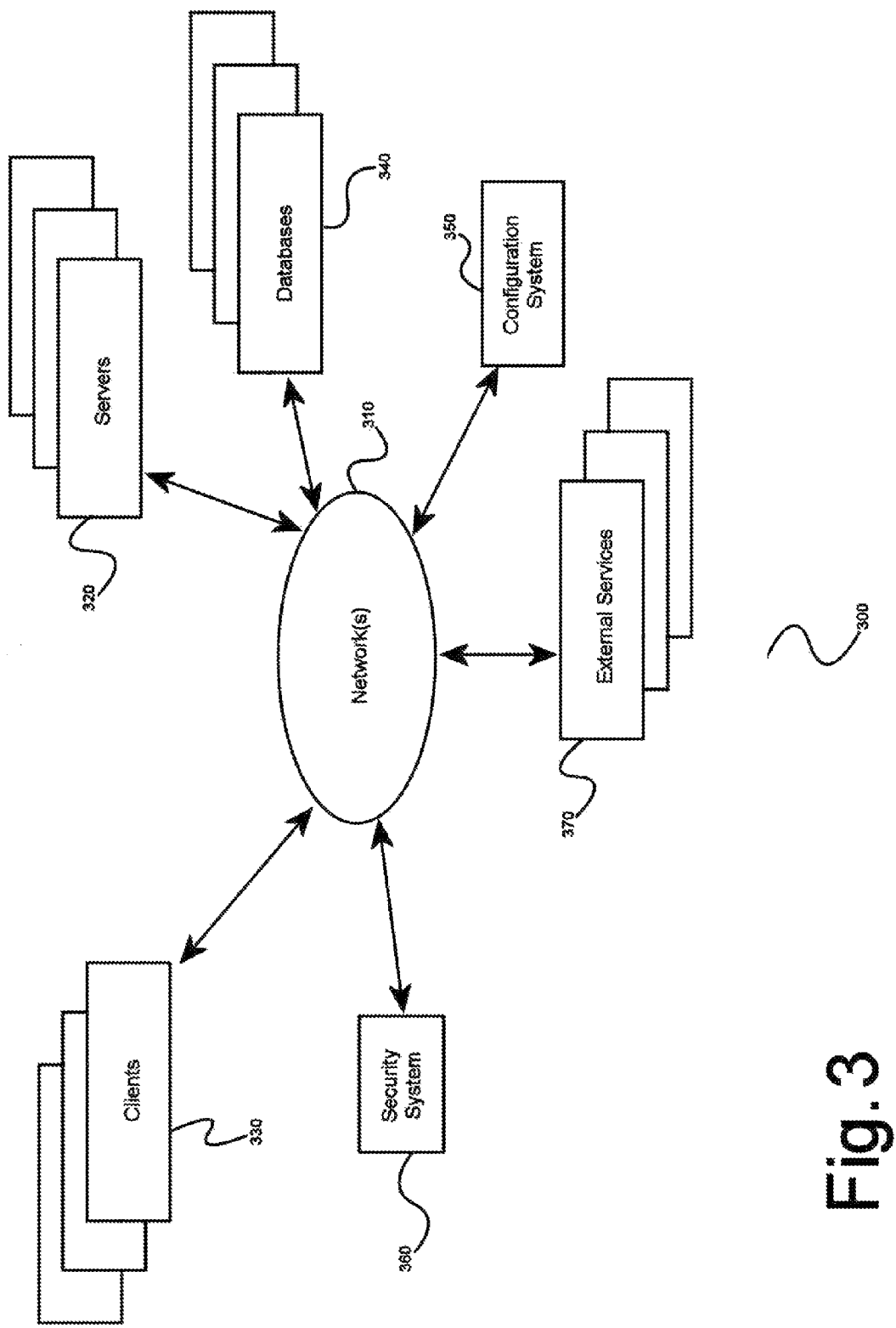
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

System Architecture

Figure 4:
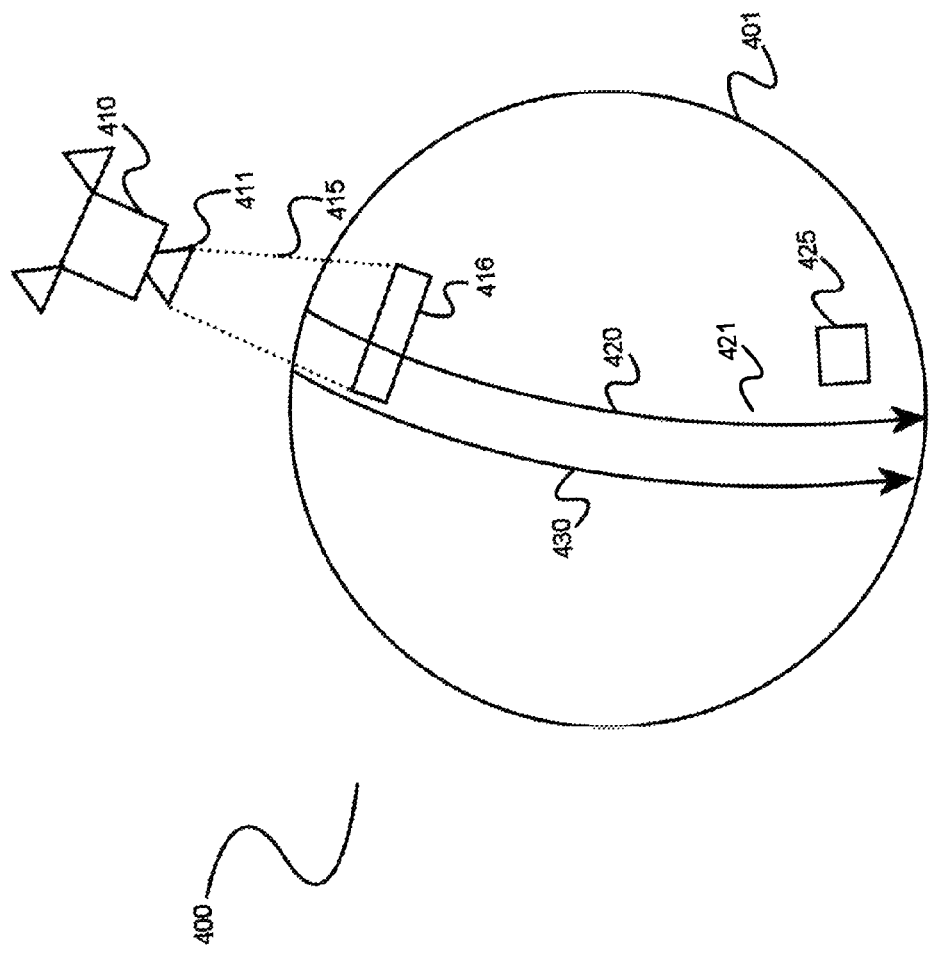
FIG. 4 (PRIOR ART) is a diagram illustrating a typical imaging satellite architecture according to the prior art.

FIG. 4 (PRIOR ART) is a diagram illustrating a typical sensing satellite architecture 400 according to the prior art, which should aid in understanding the descriptions of the various embodiments provided below. Satellite 410 orbits over planet 401 (typically but necessarily the earth), following orbital paths 420 and 430 (on successive orbits around the earth). Satellite 410 may be equipped with one or more EO, SAR and/or Signal instruments 411, which are directed to a region 416 of the earth that is typically a strip oriented perpendicularly to orbital path 420, having a width corresponding (but not necessarily identical) to the field of view 415 of EO, SAR and/or Signal instrument 411. Periodically, satellite 410 passes through regions such as region 421 wherein it is able to establish radio communication with a remote ground terminal (RGT) 425. When satellite passes through region 421, it will pass as much data as possible to RGT 425, buffering data between downloads. Since RGT's are typically located very sparsely around the earth, the time between downloads can be considerable (measured in hours), adding a large amount of latency to commercial imaging satellite systems in the art for some geographic locations.

Figure 5:
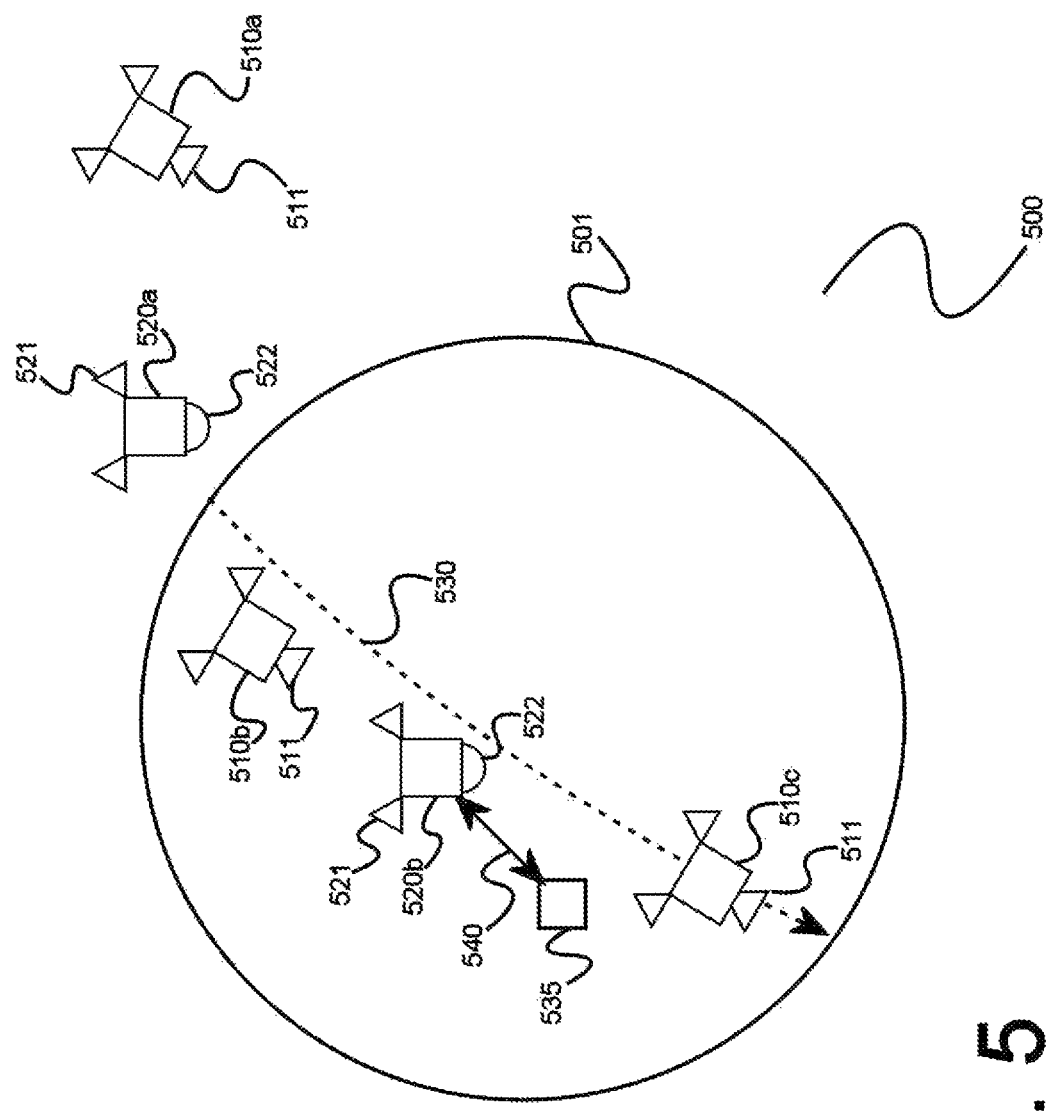
FIG. 5 is a diagram illustrating an exemplary integrated architecture for a satellite imaging system, according to various embodiments of the invention.

FIG. 5 is a diagram illustrating an exemplary integrated architecture for a satellite imaging system 500, according to various embodiments of the invention. According to the embodiment, satellites 510a-c, 520a-b each follow a single orbital plane (for example), the satellites being offset from one another along their specific orbital plane. In an exemplary embodiment, there may be five collector satellites 510 and five connector satellites 520, arranged 36° of arc apart on a single orbital path 530, such that each of the ten satellites (in the exemplary embodiment; other numbers of satellites can be used according to the invention) passes over a given point 560 on the earth successively during one orbital period. As illustrated in FIG. 4, the satellites will pass over a different point offset to the west or east of point 560 that lies along subsequent orbital path 550. In a preferred embodiment of the invention, the arrangement just described may be deployed in two orbital planes; one to allow observations at 1030 local time of the earth's surface, and one to allow observations at 1330 local time of the earth's surface, thus allowing (with a total of 20 satellites deployed in two sets of ten, each comprised of five collector satellites 510 and five connector satellites 520, one set on each orbital plane) observations at the two most beneficial times (1030, when the sun is high, illumination is high, and shadows will be present to assist in determining height of objects; and 1330, when the same conditions apply, but with shadows in the opposite direction, since the sun will have passed its nadir between successive observations by the two satellite groups).

According to a preferred embodiment, collector satellites 510a-c (of which there can be more than three, such as the example with two groups of five, mentioned above) are each equipped with a very high resolution optical instrument 511 for example that provides for collection of image strips 416 in a wide range of spectral or frequency bands. For example, in an embodiment satellites 510 are each equipped with: a very high resolution superspectral sensor with one panchromatic band in very near infrared (VNIR) with <25 cm nadir ground sample distance (GSD), 8 narrow bands in VNIR with <1.0 m nadir GSD, and 8 bands in SWIR with <2.0 m nadir GSD; and a commercial imagery environment (CIE) sensor similar to the CAVIS-3 instrument operated by DIGITALGLOBE™ on its WORLDVIEW 3 satellite, with multiple bands in VNIR and SWIR with about 15 m GSD, which may be used to correct for effects of clouds, aerosol, vapor, ice, snow, shadow, and bidirectional reflectance differential factor (BRDF) to make absolute reflectance adjustments possible to VHR images. In the preferred embodiment, both types of detectors are combined into a single collinear instrument 511 so that collinear imagery is collected coincidentally in seventeen VHR bands and multiple bands of medium resolution CIE bands, allowing easy fusion of imagery data. Moreover, the facts of colinearity and coincidence mean that VHR data can be compensated (for instance, as mentioned above, for clouds, aerosol, vapor, snow, shadow, and BRDF) using CIE data directly, without losing accuracy (since the data were taken at the same time, from the same angle, in the same conditions). Often, in the prior art, pan-sharpening or environmental compensation is performed using data from two different instruments that might have taken observations at different times or from different angle (and indeed in different environmental conditions, as cloud conditions for example may have changed over a point 560 on the earth's surface between passes by the respective imaging devices), thus introducing a potentially serious source of error. Collector satellites 520 are each equipped with a plurality of communication antennas 512, which enable them to communicate not only with remote ground terminals 425 but also with connector satellites 520, as discussed below.

According to a preferred embodiment, connector satellites 520a-b (of which there can be more than two, such as the example with two groups of five, mentioned above) are each equipped with one or more communications antennas 521, which are used to provide for communications between collector satellites 520 and connector satellites 510, as well as for communications with remote ground terminals 425, as required. Moreover, as will be described below, other types of satellites may be deployed in conjunction with co-orbital sets of collectors 510 and connectors 520, and connectors 520 are capable of communicating with these other types of satellites using antennas 521 as well. Connector satellites 520 may also be provided with an environmental sensor package 522 adapted to measure, for example, cloud opacity and cloud height. This information can be collected as part of an environmental monitoring process, and can also be used to fine tune the performance of collector satellites 520, as will be discussed shortly, with reference to FIG. 7.

Communications Architecture

Figure 6:
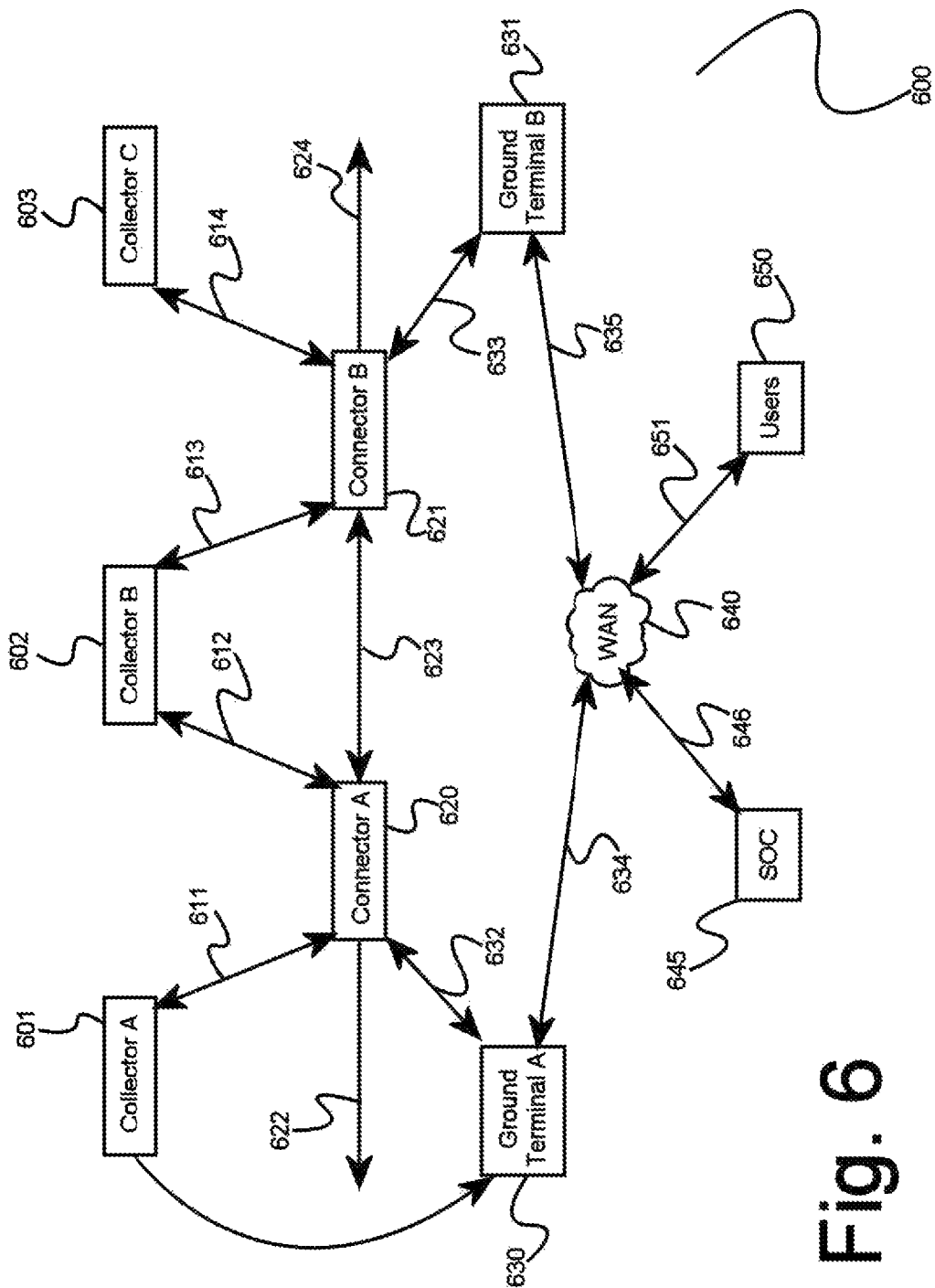
FIG. 6 is a diagram illustrating various communications paths between components of an integrated satellite architecture, according to various embodiments of the invention.

FIG. 6 is a diagram illustrating various communications paths between components of an integrated satellite architecture, according to various embodiments of the invention. Communications architecture 600 preferably enables rapid exchange of data between satellites and remote ground terminals to support near real time delivery of very high-resolution satellite imagery or other sensor data to users 650. Collector satellites 601-603, corresponding to collector satellites 510, collect VHR imagery, optionally preprocess it, and send the resulting data via paths 611-614 to one of connector satellites 620-621 (again, note that many more satellites may be used according to the invention, and the number shown in FIG. 6 is merely illustrative, and is kept small for clarity; in a preferred embodiment, there may be two sets of ten satellites, five each of collector satellites 510 and connector satellites 520, operating in two orbital bands (1030 and 1330), as discussed above). In additional, there might be hundreds of smaller satellites with various orbital inclinations and EO, SAR and/or Signals sensors and communications elements on them, also not shown for clarity. Connector satellites 620-621 communicate with each other via paths 622-624 (622 corresponds to communication with another connector not shown in FIG. 6, as does 624). Connectors also communicate on every pass (when possible) with each available remote ground terminals 630-631; paths 632-633 shown are of course logical paths; the physical paths will change as connector satellites 620-621 (and others) move over the earth relatively to remote ground terminals 630-631 (and others). Remote ground terminals 630-631 communicate, via one or more wide area networks 640 and paths 634-635, with System Operations Center (SOC) 645 and a (potentially large) number of users 650. It will be appreciated that many details have been left out of FIG. 6 for simplicity, and that various rearrangements are contemplated according to the invention. For example, in most embodiments collector satellites 601-603 will communicate directly with remote ground terminals 630-631 when in range, and will communicate via one or more connector satellites 620-621 when remote ground terminals 630-631 are not in range (which will be the majority of time in any given orbital period or time, at least because most of the earth is covered with water and thus for significant periods no remote ground terminals will be in range in those areas where there are no available Connector Satellites and/or deployed Remote Ground Terminals).

FIG. 6 is provided to allow a clear demonstration of one of the key benefits of the instant invention. In prior art imaging satellite architectures (see FIG. 4 above), image data must be buffered onboard satellites until the satellite comes into range of a remote ground terminal, at which time the satellite attempts to download as much data as possible to the remote ground terminal. In some cases, it is not possible to download everything in the time allowed (that is, during the time within which the remote ground terminals remains in communication with the satellite), so any remaining data must be stored onboard the satellite until the next opportunity for downloading. Typically, satellites have been designed to take into account the fact that certain areas of the earth are only infrequently observed (that is, data is recorded for download); for example, an imaging satellite is likely to retrieve little imaging data while traversing the Pacific Ocean, which is fairly uninteresting from a satellite imagery perspective. This means that, in the course of a typical day, all data obtained during the day can be downloaded at some point during the day, assuming transmission conditions at all remote ground terminals are nominal. Thus satellite imagery data is typically several minutes to several hours old by the time it is downloaded to a remote ground terminal and then passed to the SOC 645 for processing. By contrast, in accordance with the instant invention, data can be downloaded to remote ground terminals 630-631 almost continuously because, at almost every point in orbital paths 530, 540, at least one connector satellite 620-621 is able to download to at least one remote ground terminal 631-631 to establish the link to the SOC 645. Since data can be transferred between connector satellites 620-621 via paths 622-624 etc., it is in principle possible, according to the invention, to record critical data relating to an area of interest (AOI) in one part of the world, and then send that data via several connector satellites 620-621 halfway around the world for near real time download to a remote ground terminal 630-631 that is in communication with a connector satellite 620-621. Of course, in many cases it won't be desirable to incur the overhead of multiple inter-satellite data transfers. According to some embodiments, collected imagery data can be prioritized based on its commercial or other value, and only critical or high value data would be transferred in such a fashion; medium-value data might take advantage of a one-or-two-hop path to a download site; low-value data might be stored on its original collector satellite 601-603 until that satellite is itself in range of a remote ground terminal 630-631.

Satellite Coordination

Figure 7:
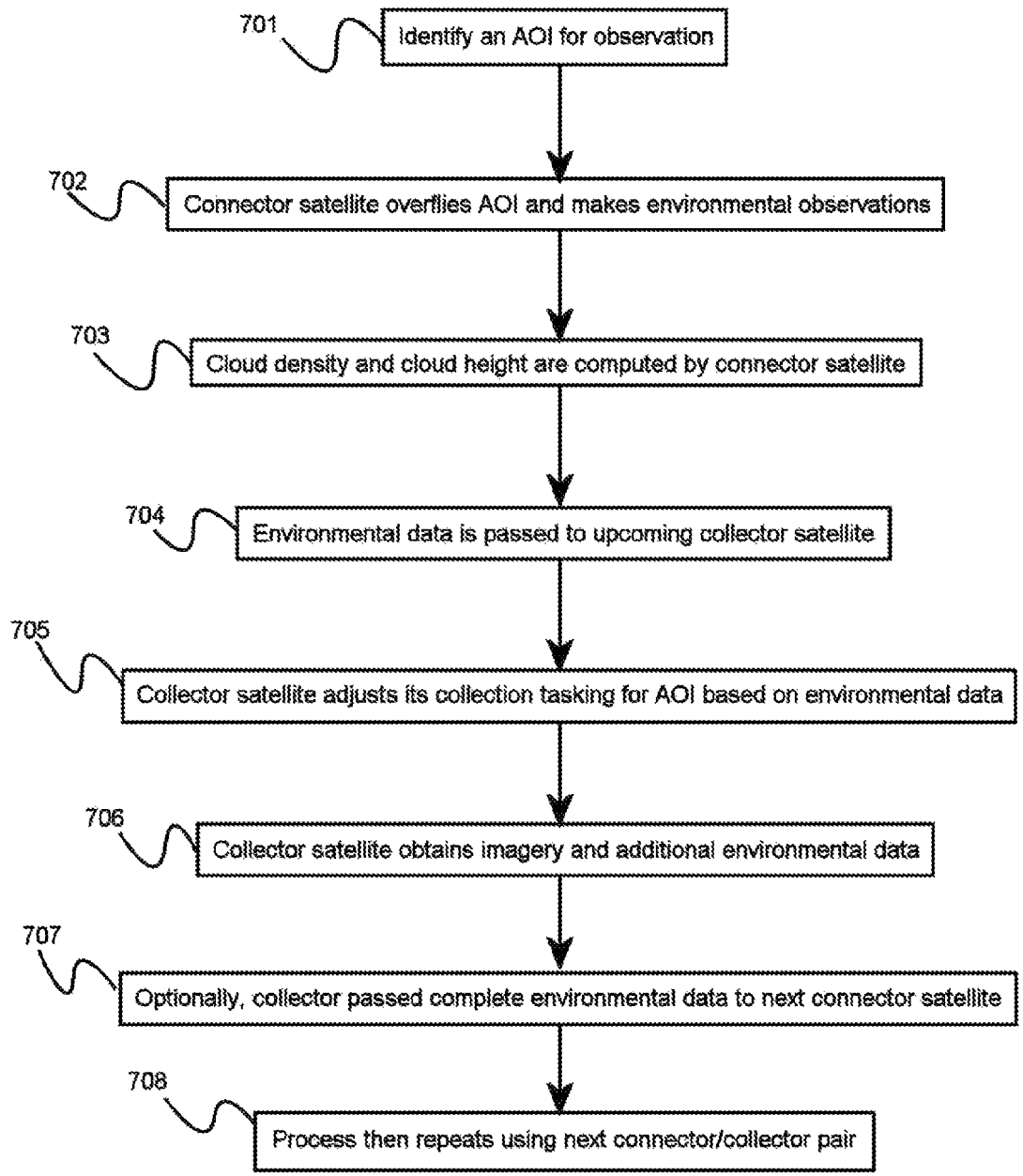
FIG. 7 is a process flow diagram illustrating a method for using advanced environmental monitoring to adaptively task a collector satellite, according to a preferred embodiment of the invention.

Another key advantage of the communications architecture 600 illustrated in FIG. 6 is that it facilitates direct coordination between satellites that may, according to the invention, improve the effectiveness of each satellite in accomplishing its mission. Accordingly, FIG. 7 is a process flow diagram illustrating a method 700 for using advanced environmental monitoring to adaptively task a collector satellite, according to a preferred embodiment of the invention. According to the embodiment, in a first step 701 an area of interest (AOI) is identified, for which very high resolution satellite imagery needs to be collected. In step 702, a connector satellite 520 overflies the AOI and makes environmental observations that may include, but are not limited to: determining extent and density of cloud cover; determining cloud height (potentially more than one value, if there are several layers of clouds); determining vapor content in the atmosphere above the AOI; determining ambient temperatures, humidity, and the like in the AOI; determining BRDF in the AOI; and so forth. For example, in step 703, connector satellite 520 computes cloud cover (percentage of AOI that has clouds above some level of opacity/density) and cloud height. Then, in step 704, relevant environmental data (including computed values, if applicable) is passed via communications network 600 to the collector satellite 510 that is immediately behind (for example, 36° behind in the same orbital plane, as discussed above) the connector satellite 520 that took the measurements in step 702. In step 705, the collector satellite 510 then adjusts its collection tasking as needed to take advantage of the environmental data provided. For example, while it is usually desirable to take VHR images at nadir (while the satellite is directly overhead the AOI), if there is thick cloud cover at an altitude of 10,000 meters directly over the target, it may be desirable to take images from an oblique angle as the collector satellite 510 approaches the AOI, so that it can "look around" the cloud cover and see the AOI without interference from clouds (as will be understood by one having ordinary skill in the art, such oblique angles come at a cost in resolution and image distortion—that latter of which can be addressed during image processing—so it will generally be avoided except when required. However, without the coordination of the advance connector satellite 520, collector satellite would simply have taken imagery at nadir, which would have been far less useful (potentially even useless) due to the cloud cover. It should be clear to one having ordinary skill in the art that this coordination procedure is quite extensible. For example, connector satellite 520 may continue taking environmental readings as it leaves the AOI, and these may be used by collector satellite 510 to take pictures at a reverse oblique angle after it has passed nadir over the AOI; such an approach makes sense if cloud cover is continuous before and over the AOI, but ends just after the AOI, allowing the collector satellite 510 to look back under the clouds and get an image that otherwise would have been lost. Similarly, given the availability of high-speed, inexpensive computing in modern satellites, it should be possible according to the invention to deal with spotty cloud coverage by carrying out a rapidly adapting collection routine that nimbly avoids clouds and achieves full or near full image coverage of an AOI. In step 706, the collector satellite 510 obtains imagery and environmental data (recall collector satellites 510 will typically have CIE instruments that can collect precise data about vapor, clouds, etc., which can update and augment the data collected by the connector satellite 520 on its earlier pass). In step 707, collector satellite 510 optionally preprocesses the collected image data, for example by radiometrically compensating for known factors ("known" because of the environmental factors measured just in advance by connector satellite 520 and updated by further collection by collectors satellite 510). Finally, in step 708 the process may be repeated using the next upcoming connector/collector satellites, potentially using a refined collection strategy as the degree of detail of the environmental picture obtained improves after several observations (of course, the benefit of multiple observations is to some extent mitigated by the fact that clouds and other environmental factors move and change, so too many observations will likely result in inaccurate results; how many is too many may be determined computationally by one or more of the involved satellites or ground personnel by analyzing collected data to determine how rapidly environmental change is occurring in the AOI at the time of relevant observations). Since a series of satellites will typically overfly the same point successively in connector/collector pairs, it can be seen that this architecture enables an intense, high-precision collection regime in areas of extreme interest, such as those where conflict or natural disasters are occurring.

Satellite Architecture

Figure 8:
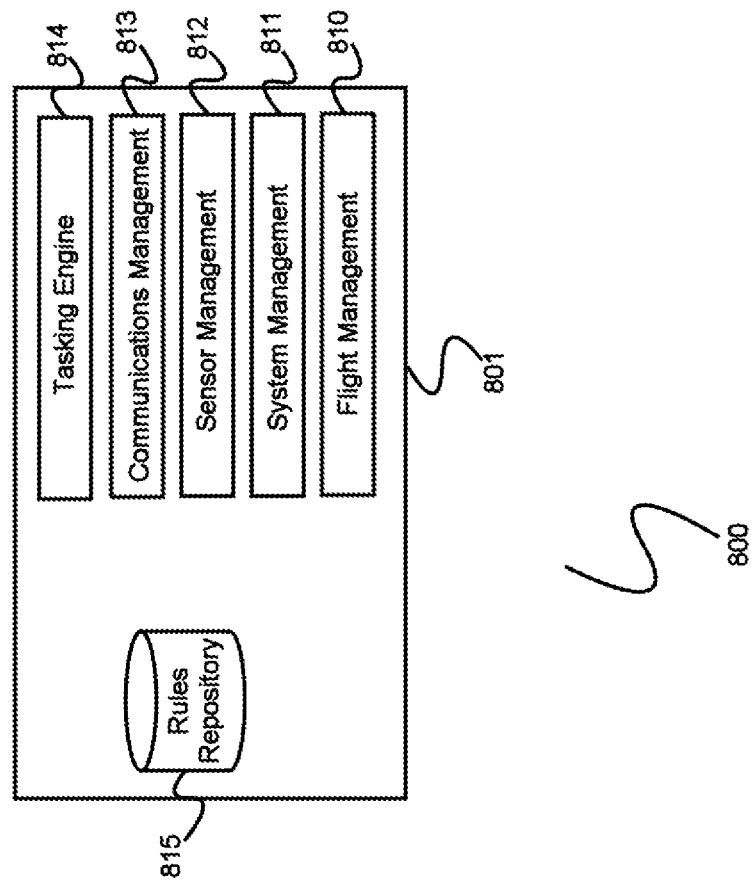
FIG. 8 is a block diagram of an exemplary system architecture for an imaging satellite, according to a preferred embodiment of the invention.

FIG. 8 is a block diagram of an exemplary system architecture 800 for an sensing satellite, according to a preferred embodiment of the invention. It will be recognized by one having ordinary skill in the art that the illustrated architecture 800 is typical, and exemplary, and represents a grouping of typical logical functions present in complex satellites such as commercial imaging satellites. The functions described herein are not exclusive, and they may in some embodiments be physically arranged in different combinations (that is, not all functions need to be grouped as they are illustrated in FIG. 8, and other functions may be present that are not shown in FIG. 8). Satellite 801 is typically an orbiting vehicle adapted to perform EO, SAR and/or Signals sensing of the earth's surface (or of the surface of another planetary or lunar body). In order to be able to perform imaging tasks effectively, satellite 801 must be able to control its orbital position and attitude (e.g., yaw, pitch and roll relative to its orbital path or some other frame of reference); for this purpose, satellite 801 is typically provided with limited propulsion capability, which is controlled by flight management system 810. Flight management system 810 typically comprises a navigation component capable of determining the precise orbital position of satellite 801 as well as its orientation (attitude); various means such as inertial and stellar navigation are known in the art, any or all of which may be used by flight management system 810. Flight management system 810 may also comprise a collision avoidance subsystem with detection capability (to detect nearby objects that may cause collisions) and collision avoidance flight maneuver capability. System management 811 carries out ongoing system management tasks for satellite 801, such as power management, defect detection and correction, radiation detection, and the like. Sensor management system 812 monitors and controls onboard sensors, such as sophisticated optics for imaging, environmental sensors such as the CIE sensors mentioned above, and so forth. Communications management system 813 is responsible for communicating with entities other than satellite 801; typically, communications will be with one or more other satellites (i.e., connector satellites 520 communicate with two collector satellites 510, and so forth), and various remote ground terminals 425 when they are in range. Communications management system 813 is typically responsible for allocating the use of bandwidth by satellite 801; since for example during a pass over a remote ground terminal only a finite amount of bandwidth is available (the bandwidth of the connection times the time over the target—although the bandwidth will actually vary, first increasing and then decreasing as satellite 801 passes over remote ground terminal 425), it is important that traffic to the remote ground terminal 425 be prioritized to ensure that critical data is transmitted, even if lower priority data has to remain buffered.

Tasking engine 814, in conjunction with rules repository 815, enables satellite 801 to be self-tasking when required. Normally, commercial sensing satellites are tasked from the ground, via uplinks from remote ground terminals 425. But one design goal of the architecture described herein is to allow the integrated satellite architecture of the invention to function well even under duress; that is, the system must be robust enough to deal with interruptions in various elements of the system. The "show must go on". To this end, it is desirable that collection—of the most appropriate areas of interest—continue even when one or more remote ground terminals 425 or the associated communications paths 632-633 are unavailable for whatever reason. In order for this to happen, satellite 801 could simply continue doing whatever it was doing when it lost contact with the ground. However, this would rarely be the desired situation; tasking before a disruption might be oriented around environmental monitoring, which may not be an important tasking priority immediately after after the disruption. Thus, in a preferred embodiment of the invention, a library of rules are stored in rules repository 815 which are used to drive satellite tasking automatically in the event of loss of communications with the ground (keep in mind, as well, that with the collector/connector architecture described above, the architecture is also resilient against the unavailability of at least some remote ground terminals, the system operations center and/or links between them because tasking could be relayed from another remote ground terminal via one or more other satellites, as described above for downlinks, so getting a satellite completely cut off from the ground is already a much less likely scenario). The process of adaptive tasking enabled by tasking engine 814 and rules repository 815 is described below with reference to FIG. 9.

Satellite Tasking

Figure 9:
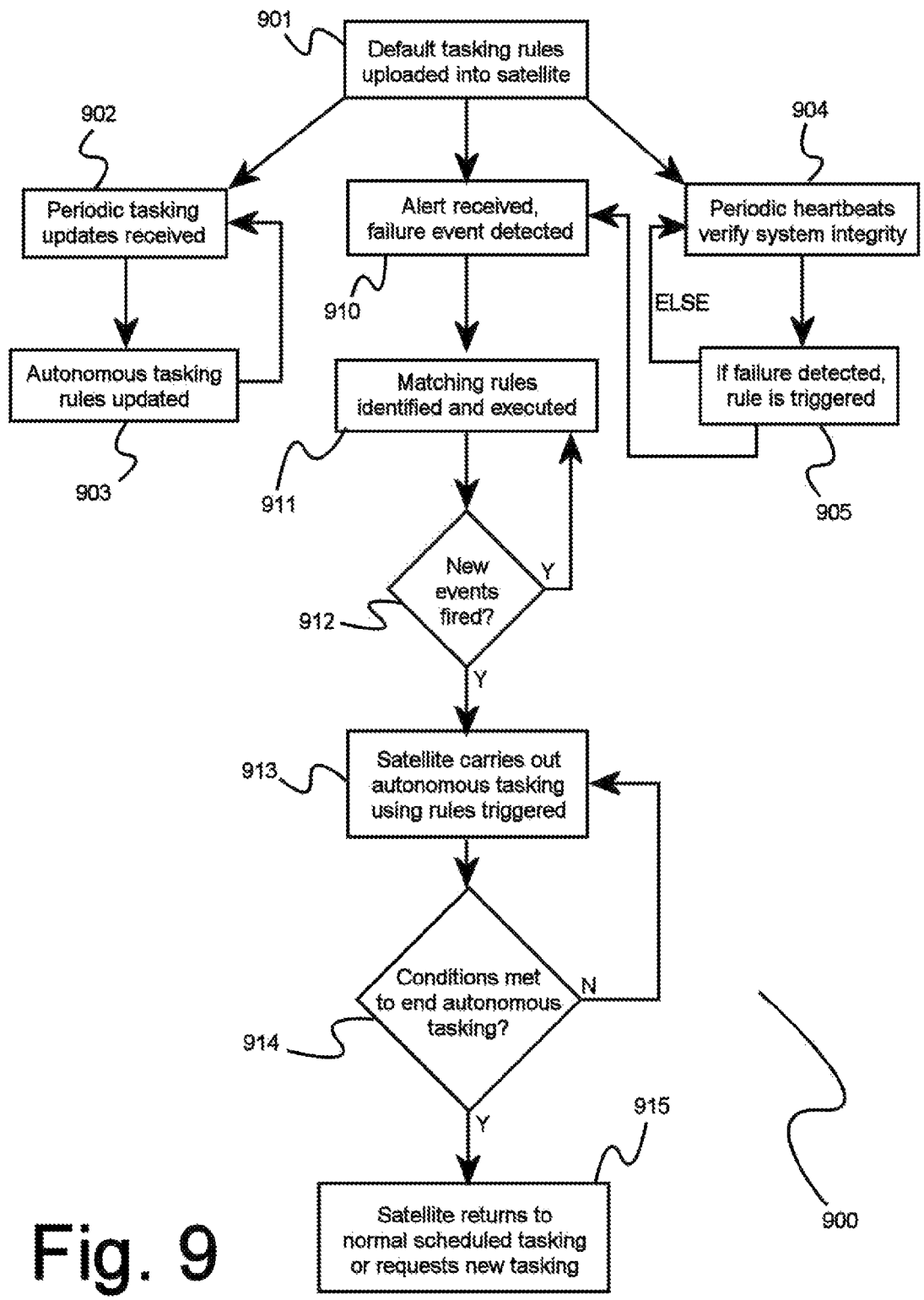
FIG. 9 is a process flow diagram of a method for adaptively tasking an imaging satellite including enabling autonomous collection operations if System Operations Center connectivity is not available when expected, according to a preferred embodiment of the invention.

FIG. 9 is a process flow diagram of a method 900 for adaptively tasking an imaging satellite, according to a preferred embodiment of the invention. According to the embodiment, in a first step 901, a set of default tasking rules may be uploaded into satellite 801, both before launch and periodically after on-orbit operations are initiated. Default rules may be updated from time to time, as policies or threats change; such updating is carried out in steps 902-903. In step 902, periodic tasking updates are received; however, it should be noted that aperiodic updates (for example, in response to a change in the tasking priorities) may be undertaken using the same process. It should be clear that during periodic (or aperiodic) rules updates, some, all, or none of the existing rules may be changed; new rules may be added; and rules may be deleted. When updates are received, in step 903 rules repository 815 is updated by overwriting changed rules, adding new rules, and deleting rules that have been so designated. In some embodiments, rules are prioritized or numbered so that rule execution has a deterministic behavior; in such embodiments, the update process must either update or reassign priorities or numbers to maintain internal consistency. During normal satellite operations, tasking will proceed as directed by ground control, and periodic checks, such as heartbeats, may be used to ensure continued connectivity to ground control. Heartbeats are envisioned to be encoded status messages, including status exception messages that required immediate attention by the operators, other satellites and/or ground systems. Various approaches may be used in step 904 to use heartbeats to verify system integrity. In one approach, tasking engine 914 has a schedule of expected connection times to various remote ground terminals 425. When in a "should-be-connected" period, heartbeat packets may be transmitted to remote ground terminal 425 at some determined periodicity (for example, one minute); if more than some configured number of heartbeat messages are not replied to (e.g., more than one, more than zero, etc.), an exception condition may be declared by tasking engine 914. In some embodiments a failure to receive a response may lead to immediate generation of a follow-up heartbeat message, and again a configurable parameter may be used to define the number of retries to attempt before declaring a failure. In another approach, heartbeats may be performed continuously at some defined (configurable) periodicity such as one minute, using either remote ground terminals 425 (when in range) or adjacent satellites in the same orbital path (i.e., a collector satellite 510 may preferably attempt maintain "heartbeat connectivity" with its leading connector satellite 520, which is the one it would receive useful environmental data from, with backup heartbeats to the trailing connector satellite 520 and any in-range remote ground terminal 425). Different policies may be used in such an arrangement; in some cases, any loss of heartbeat connectivity with a leading connector satellite 520 for a collector satellite 510 would be considered an exception—and conversely any loss of heartbeat connectivity to a trailing collector satellite 510 would be considered an exception for a connector satellite 520. Alternately, any successful heartbeat may be considered adequate to avoid declaring an exception (the difference being that, in the latter case, the satellite in question could still receive new tasking because it is in communications with the overall system; in the former case, an exception would be declared because the connector-collector pair operation is disrupted). If an exception condition is detected in step 903, then in step 904 an appropriate rule is triggered and execution of method 900 continues at step 910; otherwise, the heartbeat process continues normally at the next time step in step 903.

Once an alert (such as notification of a heartbeat irregularity or receipt of an alert explicitly from another satellite or from a ground station—or indeed from an onboard collision sensor, for example), is received in step 910, tasking engine in step 911 identified any rules (from rules repository 915) that match the alert received and executes them. Examples of rules and corresponding actions that might be received and taken include:

If all communications are lost, immediately carry out predefined autonomous tasking; for example, immediately begin very high resolution imaging of known areas of interest that are likely to be of use until the situation is resolved;

If communications are lost only with the leading connector satellite 520 in a specific collector satellite 510, begin using the trailing connector satellite 520 as primary communications node, and collect environmental data from the next—leading connector (obtained via the trailing connector or a ground station) and use that to estimate environmental conditions over areas of interest, allowing for increased time between environmental observations and imaging operations;

If an earthquake is detected by seismologists, an alert could be sent to the satellite system described herein, and all satellite could have a priority tasking to focus on the epicenter and threated areas on the ground until otherwise directed, automatically and immediately;

If communications are lost only to a single remote ground terminal 425, query the system to see if any other ground stations are also offline; the system may have rules to respond differently to one or all ground stations' being offline.

The previous examples are just that: examples. Many rules are possible according to the invention, and the general approach of using proactive adjustment of tasking rules based on communications status and alert events. After any actions required by a given rule are taken, in step 912 a check is made to determine whether the rules triggered and actions taken have themselves "fired" any new rules (this is a common feature of rules engines, as will be understood by one having ordinary skill in the art). If so, then step 911 is repeated using the new triggered rule; if not, execution passed to step 913, in which the satellite then carries out autonomous tasking to the extent required by the rules triggered in steps 911. Periodically (or as directed by ground control), in step 914 a check may be made to determine whether conditions have been met to terminate autonomous tasking (for instance, communications have been restored, or the earthquake has been determined not be a threat, etc.). If they have not, then autonomous tasking continues in step 913; if conditions have been met, then in step 915 the affected satellite returns to normal scheduled tasking or requests new tasking (the precise action to take at this point can itself be configured via a rule).

Figure 10:
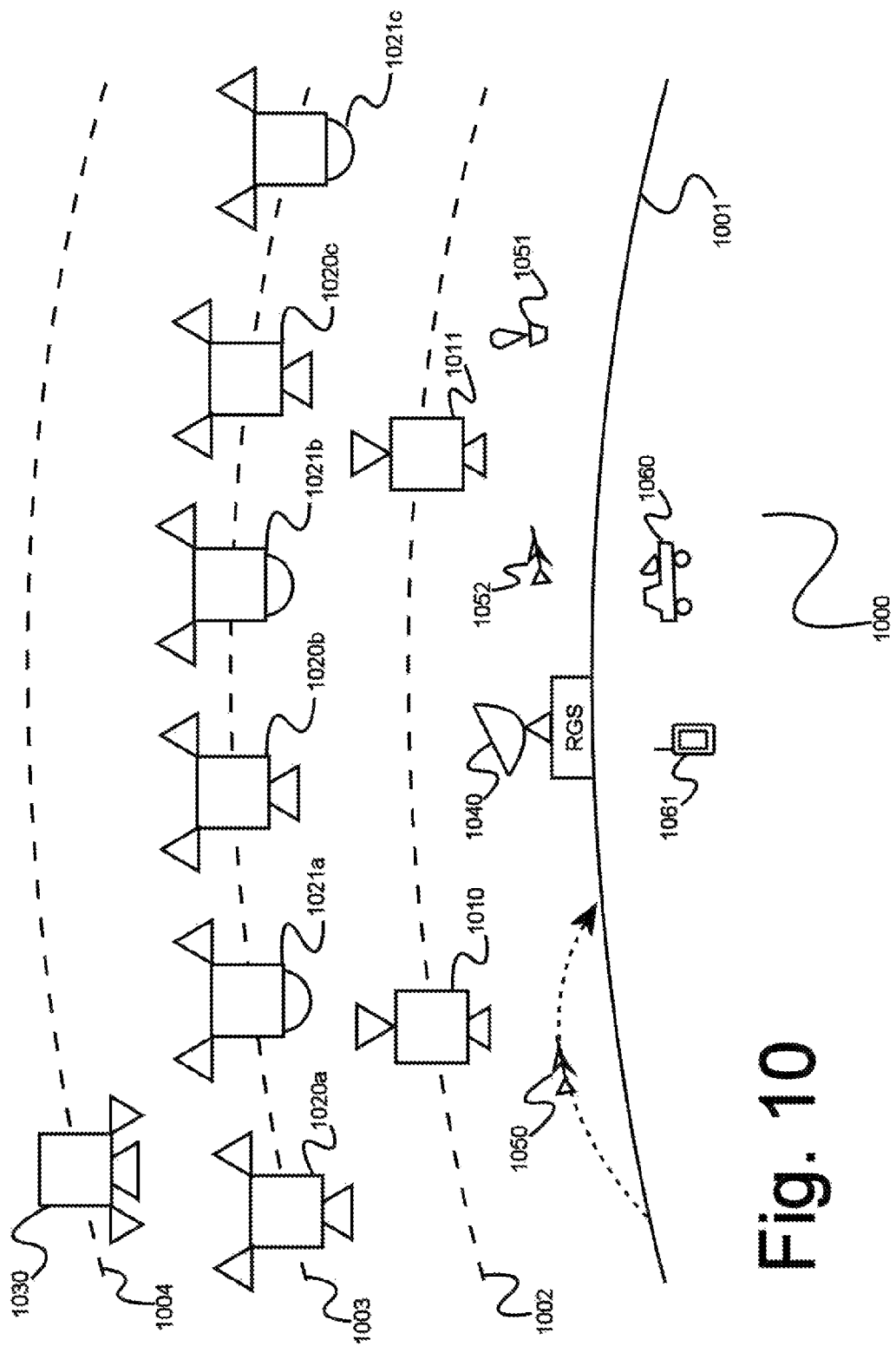
FIG. 10 is a diagram of an imaging-and-sensing-in-depth architecture, according to an embodiment of the invention.

FIG. 10 is a diagram of an imaging-in-depth architecture 1000, according to an embodiment of the invention. According to the embodiment, various orbital heights above planetary surface 1001 may be used for specific imaging purposes. Orbit 1003 may for example used for the alternating connector-collector satellite architecture described above (in FIG. 5 and corresponding text). A plurality of collector satellites 1020a-c is alternated with a plurality of connector satellites 1021a-c, exactly as described above. In a lower orbit 1002, a plurality of smaller satellites 1010, 1011 may be deployed. These satellites typically will not communicate with each other, but may communicate with connector satellites 1021 to maintain substantially continuous communications (and with remote ground terminals 1040, when in range, of course). According to an embodiment, smaller satellites 1010, 1011 may be equipped with fewer sensors than collector satellites 1020, but be larger in number; their primary goal is to obtain more frequent observation of targets of interest, at somewhat lower resolution than collector satellites 1020, in order to support change detection and surveillance activities at frequent intervals. For example, satellite 1010 may be equipped with one panchromatic sensor with 50 cm resolution, 8 VNIR bands at 2 m resolution, and 4 SWIR bands at 4 m resolution. Satellite 1011 may be equipped with one panchromatic sensor at 50 cm resolution, 8 VNIR bands at 2 m resolution, 3 SWIR bands at 4 m resolution, and one medium wave infrared (MWIR) band at 8 m resolution. This range of sensors is suitable to allow frequent revisits of targets of interest at imaging resolutions good enough to support change detection (for instance, troop movements or flood progress), and has less high resolution coverage in multiple bands to allow frequent environmental monitoring (the SWIR and MWIR bands can be used for agricultural monitoring, and frequent am and pm passes allows for better overall coverage of the whole earth).

In a higher orbit 1004, a small number of super high resolution (SHR) satellites 1030 may be deployed to support national defense and precision measurement missions. These satellites 1030 will typically be in communications with connector satellites 1021 and collector satellites 1020, and with remote ground terminals 1040 when in range (which will be more often because of satellite 1030's higher orbit). According to a preferred embodiment, satellites 1030 will be equipped with one panchromatic and 8 bands VNIR at super high resolution (much better than 0.5 m resolution), one pan and 8 bands SWIR at very high resolution, a plurality of bands MWIR and thermal-infrared (TIR). This large number of very precise bands means that satellite 1030 will be more expensive and complex member of system 1000, and its mission is determined accordingly. Because of the small number (one to three satellites 1030 in orbit 1004), the dwell time for any location on earth will be lower than for the other orbits/satellite types in system 1000, but the precision and number of bands is much higher. Accordingly, satellites 1030 will typically be used for precision measurement (for example, precision agriculture measurements), which require regular but not frequent revisits but high precision, and for special national tasking. In addition, while much of the imagery collected by satellites 1030 will not be available to all commercial customers (because of its high resolution and corresponding national regulations), precise economic measurements will be available, regularly updated, to commercial customers. Satellite 1030 will also typically be provided with a Commercial Imagery Environment (CIE) Sensor descended from DIGITALGLOBE's CAVIS3 with ~15 m nadir GSD, for correction of effects of clouds, aerosol, vapor, ice, snow, shadow, BRDF to make absolute reflectance determinations possible routinely.

As needed by special tasking, either because of loss of satellites (or communications to satellites); or because immediate response is needed to some event such as an attack, a tornado, or other sudden event; or because continuous close coverage is needed to monitor an area of interest (for example, to control response to wildfires in the American West, or to assess the impact of a tsunami, or to monitor use of chemical weapons and refugee movements in Syria continuously), in a preferred embodiment the three-orbit satellite architecture of system 1000 may be augmented from time to time by autonomous or manned aircraft 1050, 1052 or balloons 1051, each equipped with one or more cameras or other optical sensors and communications equipment to relay data to remote ground terminals 1040 while in flight (in some cases, data may be uploaded after landing, although obviously this has a significant effect on data latency). Such ad hoc airborne sensor deployments can give system 1000 a high degree of resilience against disruption and responsiveness to unexpected events, and can also provide a temporary ability to provide continuous "eyes on target" for selected high-value targets when required.

While in normal operation all data collected by satellites and aircraft is delivered via a network of ground control stations 1040, using the inter-satellite relay discussed above to achieve very low latency, in some cases it may not be possible or desirable to use a remote ground terminal 1040, or at least to augment them in the communications architecture. This may be because they (or their data links) are under attack (kinetic or cybernetic), or because certain data is needed at a certain place more quickly than can be achieved using the standard communications and data architecture, or because certain data is so sensitive it must be handled in a special way. For these (and possibly other) reasons, it may be desirable to have ad hoc air-to-ground communications capabilities beyond what is provided by the network of remote ground terminals 1040. Accordingly, in an embodiment satellites 1010, 1020, 1021, and 1030 may from time to time communicate directly with mobile ground stations such as hand held devices 1061, or communications trucks/vans 1060.

It should be clear to one have ordinary skill in the art that the three-tier satellite architecture with interlinked collector and connector satellites in the main (middle) orbit and ad hoc airborne support provides a robust, resilient, and highly responsive imaging system capable of being rapidly redirected and of providing near real time imagery support for any target anywhere in the world.

It will also be appreciated by one having ordinary skill in the art that the presence of satellites of various types (e.g., EO, SAR, Signals, etc.) in a system according to the invention also implies the presence of widely varying sensor resolutions (for example, in EO imaging satellites, different frequency bands will have different resolutions, with infrared or short wave infrared having lower resolutions and higher frequency bands having higher resolutions). In such a constellation, it may not always be possible to maintain continuous coverage of an object of interest, or of a plurality of geospatially distributed objects of interest; gaps in coverage may adversely impact the ability to maintain custody of such objects of interest in a surveillance task. In situations of this type, one may, according to the invention, switch between sensors as different satellites move into position to maintain coverage on such objects of interest. When a lower resolution sensor such as an infrared sensor takes custody, RGT 425 or autonomous tasking elements of satellites may coordinate to pass custody explicitly from a previous satellite to the satellite carrying the infrared sensor. The infrared sensor, having lower resolution, might not have been able independently to detect and identify such objects of interest, but since they had already been detected and potentially identified by earlier satellites with higher resolution, coordination between the satellites would allow the infrared-bearing satellite to identify an infrared target at the appropriate geospatial location as the object of interest for which custody is to be maintained. In this way, a plurality of satellites with a plurality of sensors potentially of different types and resolutions may, acting in concert, maintain nearly continuous custody on an object of interest or a plurality of objects of interest. Moreover, in such scenarios, where a gap in coverage does occur, it is likely to be shorter in duration than heretofore, and therefore even though an object of interest may have moved during the gap, it may still be possible to positively identify the object of interest after the gap in coverage passes, since the possible movement of the object of interest will be limited enough to allow near-continuous custody maintenance with gaps compensated for. Similarly, various sensors have specific advantages that may allow more aggressive surveillance in otherwise compromising situations. For example: SAR sensors can track objects at night, when EO sensors might be unable to do so; IR may be able to track an object that is hotter than background, which was detected and localized in daylight, at night; SAR can detect objects through clouds while SWIR can detect objects through smoke, allowing tracking of an object of interest through trajectories comprising regions compromising these environmental challenges. The invention makes it feasible to provide effective persistent surveillance and not just occasional reconnaissance (these are the S and R of ISR—surveillance and reconnaissance). It is desirable to, and the invention does, enable nearly continuous access to two or more geographically distribute areas of interest (AOIs) 24×7 with enough overlap between the modalities of the combined constellation of collectors that it is possible to maintain custody of the detection, location, identification, and characterizations (DLIC) of objects of interest. A fundamental idea in this area is to recognize that if one can precisely DLIC a specific object in a specific state at a specific location and develop a (possibly shifting with the sensor mix) parameter continuity between successive observations of the overlapping modalities of a heterogeneous mix of collectors, then one effectively has and maintains custody over the object.

The skilled person will be aware of a range of possible modifications of the various embodiments described above. Accordingly, the present invention is defined by the claims and their equivalents.

What is claimed is:

1. A system for operating an integrated architecture for near real-time satellite collection and communications, comprising:

a plurality of collector satellites, each comprising at least a plurality of electro-optic (EO), synthetic aperture radar (SAR) and/or Signals sensing hardware and a plurality of software instructions stored in a memory and operating on a processor of the satellite, wherein the software instructions are configured to capture a plurality of EO, SAR, and/or Signals sensor data of at least a portion of a region of the surface of the Earth, the sensor data being based at least in part on sensor data received from at least a portion of the plurality of EO, SAR, and/or Signals sensor hardware, and the region of the surface of the Earth being based at least in part on the satellite's position above the surface of the Earth;

a plurality of connector satellites, each comprising at least a plurality of communication interfaces configured to provide two-way communication with at least a collector satellite, to provide two-way communication with remote ground terminals (RGT) that are connectable via wide area networks to System Operations Center and potentially to user, and a plurality of software instructions stored in a memory and operating on a processor of the satellite, wherein the software instructions are configured to communicate with at least a collector satellite using a communication interface;

wherein a first collector satellite updates a plurality of programming instructions stored in a memory and operating on a processor of the first collector satellite, the update being based at least in part on the communication from a connector satellite;

wherein the first collector satellite collects a plurality of image data pertaining to a region of the surface of the Earth, the region being based at least in part on the first collector satellite's position over the surface of the Earth, and the image data being based at least in part on at least a portion of the updated programming instructions; and wherein at least a portion of the collector satellites and at least a portion of the connector satellites are arranged in a plurality of offset orbits about the Earth.

2. The system of claim 1, further wherein at least a portion of the plurality of connector satellites further comprise at least a plurality of environmental sensor hardware, wherein the software instructions are further configured to capture environmental data about at least a region of the Earth using the environmental sensor data, the region of the Earth being based at least in part on the satellite's position above the surface of the Earth.

3. A method for using advanced environmental monitoring to adaptively task a collector satellite, comprising the steps of:
- receiving, at a connector satellite comprising at least a plurality of communication interfaces configured to provide two-way communication with at least a collector satellite, and a plurality of software instructions stored in a memory and operating on a processor of the satellite, wherein the software instructions are configured to communicate with at least a collector satellite using a communication interface, a plurality of operating instructions comprising software instructions stored in a memory and operating on a processor of the satellite;
- observing a plurality of environmental conditions in a region of the surface of the Earth, the region being based at least in part on the connector satellite's position over the surface of the Earth;
- communicating at least a portion of the environmental data to a collector satellite comprising at least a plurality of electro-optic (EO), synthetic aperture radar (SAR), and/or Signals sensor hardware and a plurality of software instructions stored in a memory and operating on a processor of the satellite, wherein the software instructions are configured to capture a plurality of EO, SAR, and/or Signals sensor data of at least a portion of a region of the surface of the Earth, the sensor data being based at least in part on sensor data received from at least a portion of the plurality of EO, SAR, and/or Signals sensor hardware, and the region of the surface of the Earth being based at least in part on the satellite's position above the surface of the Earth;
- updating, at the collector satellite, a plurality of programming instructions stored in a memory and operating on a processor of the satellite, the update being based at least in part on at least a portion of the plurality of environmental data; and
- collecting, at the collector satellite, a plurality of image data pertaining to a region of the surface of the Earth, the region being based at least in part on the satellite's position over the surface of the Earth, and the image data being based at least in part on at least a portion of the updated programming instructions.

4. The method of claim 3, further comprising the step of communicating at least a portion of the environmental information to a next collector satellite.

* * * * *